I. S. & H. R. Russell,
Mower.
No. 81,215.  Patented Aug. 18, 1868.
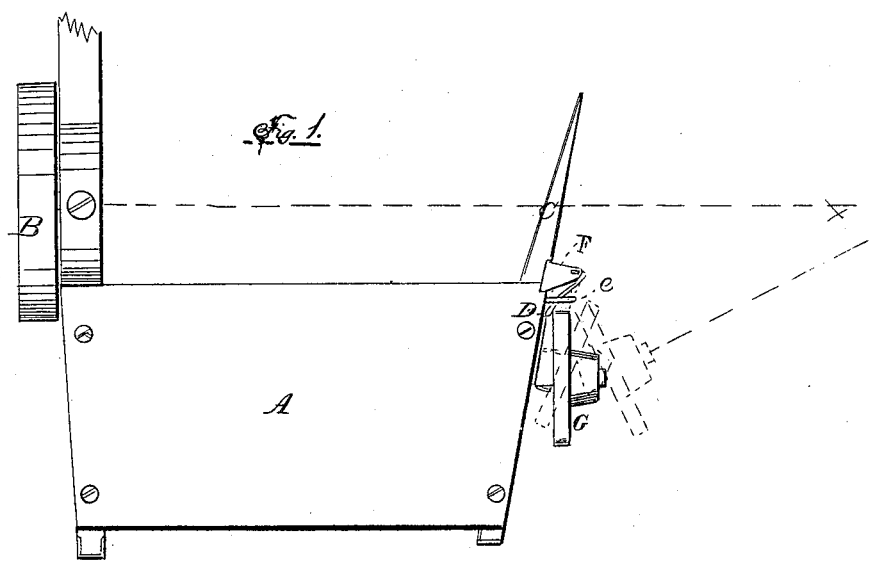
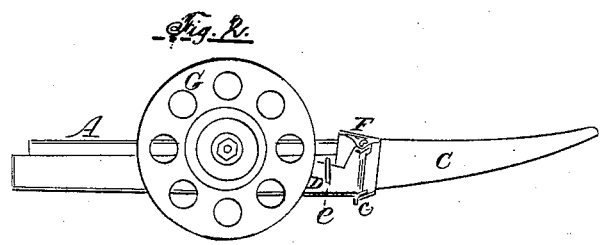
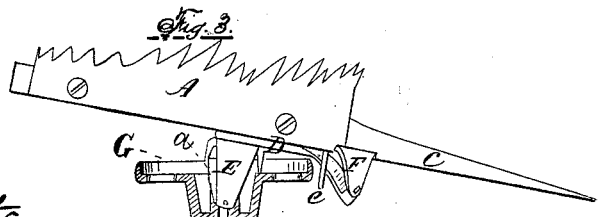
Witnesses:
Sydney E. Smith
W. Morris Smith
Inventors:
Isaac S. and Henry R. Russell
by Attorneys
Brown, Coombs & Co.

UNITED STATES PATENT OFFICE.

ISAAC S. RUSSELL, OF NEW MARKET, MARYLAND, AND HENRY R. RUSSELL, OF WOODBURY, NEW JERSEY.

IMPROVEMENT IN HARVESTERS.

Specification forming part of Letters Patent No. 81,215, dated August 18, 1868.

*To all whom it may concern:*

Be it known that we, ISAAC S. RUSSELL, of New Market, in Frederick county and State of Maryland, and HENRY R. RUSSELL, of Woodbury, in Gloucester county and State of New Jersey, have invented a new and useful Improvement in Harvesters; and we do hereby declare that the following is a full, clear, and exact description thereof, reference being had to the accompanying drawings, through letters of reference marked thereon, forming part of this specification, and in which—

Figure 1 represents a plan view of so much of a harvester as is necessary to illustrate our invention. Fig. 2 is a side elevation of the same, and Fig. 3 a partial horizontal section thereof.

This invention may be considered as an improvement upon that for which Letters Patent were granted to us, bearing date August 20, 1867, and numbered 67,914, and its object is to prevent the drag of the supporting-wheel in turning corners, which drag is owing to the fact that the axis of the supporting-wheel is not in the same plane with that of the driving-wheel; and our invention consists in so connecting the supporting-wheel with the machine that it will automatically assume a position nearly parallel to the line of direction in which that part of the machine may at any moment be moving.

To enable others to make and use our invention, we will proceed to describe its construction and operation by referring to the drawing, in which the same letters occurring in the several figures indicate corresponding parts.

This our invention is applicable to any of the well-known forms of reaping and mowing machines in which the line of the axis of the driving-wheel is formed of that of the outer or supporting wheel, and of which A represents the platform; B, the main or driving wheel; C, the dividing-finger; and G, the supporting-wheel, which is connected with the machine by an intermediate plate or bar, D, rigidly attached to clips E, between which the hub $a$, in which the introverted axle of the wheel rotates, is pivoted. This plate or bar D, at its opposite or forward end, is slightly twisted outwardly at its upper edge to an angle of, say, twenty-five degrees, more or less, from the vertical line, and is also formed on a bevel forwardly at the same end, as shown in Fig. 2, and so constructed in any convenient manner as to form a hinge-joint with the bracket F by passing the pin $c$ through the ears of both parts. The bracket F, being attached to the frame of the machine, forms a hinged connection of the wheel with said frame, so that it is free to travel in close contact therewith or swing off at an angle when the driving-wheel B is turning a curve around the outer wheel, which swinging motion is limited by the stop $e$ hooking over the bar D, which prevents it from swinging further than is necessary to accomplish the desired result, the lateral inclination of the hinge tending, by the weight of the machine, to keep the support of the wheel in contact with the frame of the machine, as represented in Fig. 1, when there is no lateral drag of the wheel upon the ground, and the forward inclination thereof compensating for the lateral twist in the bar D when swung out from the machine, as represented in outline in same figure, so that in any position the wheel may remain perpendicular, or nearly so.

In turning the outer or grain end of the machine backward on a center or point, though it may be a shifting one, at or near the main wheel B, the supporting-wheel G will assume the position represented in outline in Fig. 1 by the pivoted action of the axle-bearing, as fully described in Letters Patent before referred to, thus assuming a position at right angles to the radius of the curve it describes.

If, then, the driving-wheel moves forward while the supporting-wheel is not rolling, or if it moves forward faster than the supporting-wheel, describing an arc around, say, the point $x$, the supporting-wheel, if rigidly secured to the frame of the machine, would necessarily drag over the ground, on account of the tendency of the driving-wheel, in its forward motion, to move away from the outer or supporting wheel; but, being hinged as described, this natural tendency of the wheel to get farther apart causes the outer one to swing off, as represented in outlines, until it assumes a position nearly parallel to the direction in which that part of the machine may be moving, or with its axle pointing to the same center around which the driving-wheel is moving, or nearly so.

Having thus described our invention, what we claim as new, and desire to secure by Letters Patent, is—

1. The coupling-plate D, formed with a twist, so as to assume a vertical position where attached to the axis of the wheel, and an outward inclination at its hinge-pin connection with the machine, substantially as and for the purpose set forth.

2. The combination of the coupling-plate D, constructed and hinged to the machine, as described, with the pivoted axis of the wheel G, substantially as set forth.

3. A supporting-wheel which is so constructed and applied to a harvester that the horizontal axle about which it turns, and also the arm to which said axle is applied, shall be free to vibrate and allow the wheel to conform to the circular movements of the machine while turning, in the manner substantially as specified.

ISAAC S. RUSSELL.
    HENRY R. RUSSELL.

Witnesses to signature of Isaac S. Russell:
 HAMILTON STIER,
 JOHN T. LOWE.

Witnesses to signature of Henry R. Russell:
 S. W. STOKES,
 WM. C. STOKES.